L. P. Decker.
Ferry Guard.

No. 55,628. Patented Jun. 19, 1866.

Witnesses; Inventor;

United States Patent Office.

LEWIS P. DECKER, OF BROOKLYN, NEW YORK.

IMPROVEMENT IN FERRY-BRIDGE GATES.

Specification forming part of Letters Patent No. 55,628, dated June 19, 1866.

*To all whom it may concern:*

Be it known that I, LEWIS P. DECKER, of Brooklyn, E. D., in the county of Kings and State of New York, have invented a new and useful Improvement in Ferry-Bridge Gates; and I do hereby declare that the following is a full, clear, and exact description thereof, which will enable others skilled in the art to make and use the same, reference being had to the accompanying drawings, forming part of this specification, in which—

Figure 1:
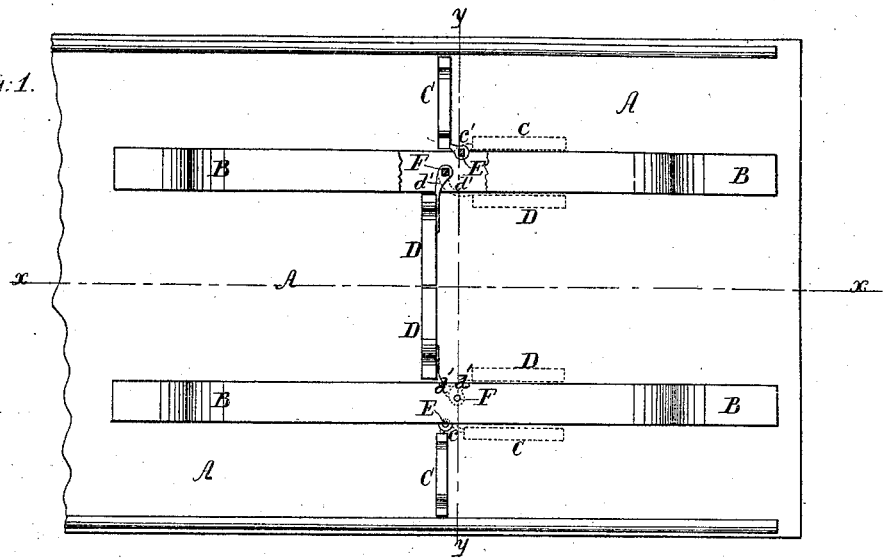
Figure 2:
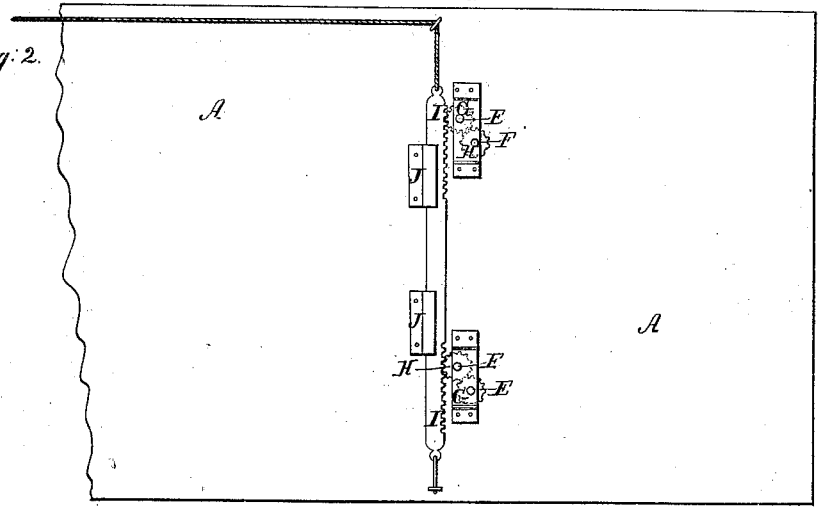
Figure 3:
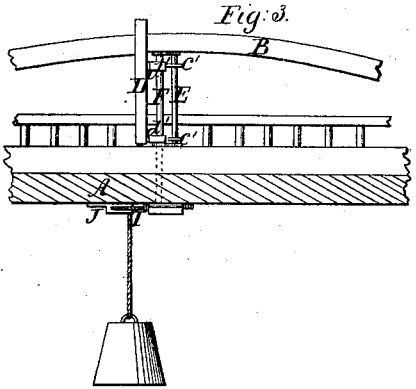
Figure 4:
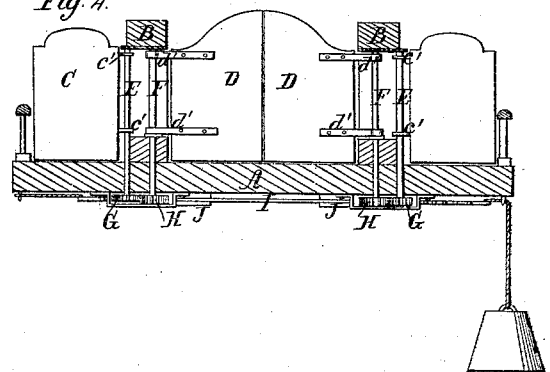

Figure 1 is a top or plan view of a portion of a ferry-bridge with my improved gates attached. Fig. 2 is an under-side view of the same. Fig. 3 is a detail sectional view of the same, taken through the line $xx$, Fig. 1. Fig. 4 is a vertical cross-section of the same, taken through the line $yy$, Fig. 1.

Similar letters of reference indicate like parts.

My invention has for its object to furnish an improvement in the construction and arrangement of ferry-bridge gates, by means of which they may be operated simultaneously and from any convenient position; and it consists, first, in the combination of gates, constructed and arranged as hereinafter described, with the shafts to which they are attached and with the bridge-arches or other convenient support; and second, in the combination of a ratchet-bar and gear-wheels with each other and with the shafts to which the gates are attached.

The bridge A and arches B are constructed and arranged in the ordinary manner.

The gates C and D may be constructed of any desired material and style.

The gates C, that close the passage-way for foot-passengers, are single gates, and they are hinged to the vertical bars or shafts E by means of eyes $c'$, which must be of sufficient strength to support the gates.

The holes through the eyes $c'$, through which the shafts E pass, are square, so that the gates may be operated by the said shafts.

The gates D, that close the passage-way for teams, are double, as shown in the drawings, and are hinged to the shafts F by eyes $d'$, in the manner before described. The shafts E and F are vertical, and are pivoted to the arch and frame of the bridge, as shown in Fig. 4; or, if it is desired to erect the gates at some other point, they may be pivoted to any suitable support prepared for that purpose.

The parts of the shafts E and F that pass through the eyes $c'$ and $d$ are square, so as to move the gates as they themselves are moved. To the lower ends of the shafts E and F, projecting beneath the bridge, are attached cog-wheels G and H in pairs, as shown in Fig. 2. The teeth or cogs of each pair mesh into each other, and the teeth of one or the other of each pair mesh into the teeth of the ratchet-bar I; or the cog-wheels may all be so arranged that each shall mesh into and be operated by the ratchet-bar I, if desired, and the width of the arch is sufficient to admit of such arrangement. The bar I is supported by and slides in suitable supports J, attached to the under side of the bridge A, as shown in Fig. 2.

Upon the edge of the bar I are formed teeth, as shown, which mesh into two or more of the cog-wheels G H. To one end of the bar I is attached a chain, K, which passes over a pulley or other support, and has a weight, L, attached to it sufficient to draw the bar I into the position shown in Fig. 4, and close the gates when the other end of the bar I is released. To the other end of the bar I is attached a chain or rope, M, which, passing over pulleys or friction rollers as its direction is changed, is brought into such a position that it may be reached and operated by the attendant even when a crowd may be collected about the gates.

The rope M may be operated by a capstan, wheel, and axle, or any other suitable and known device.

When open the gates are thrown back against the arches B of the bridge, as shown in red in Fig. 1.

I claim as new and desire to secure by Letters Patent—

1. The combination of the gates C and D, constructed and arranged as herein described, with the shafts E and F and with the bridge-arches or other suitable supports, substantially as described, and for the purpose set forth.

2. The combination of the ratchet-bar I with the gear-wheels G and H and with the shafts E and F, substantially as described, and for the purpose set forth.

LEWIS P. DECKER.

Witnesses:
JAMES T. GRAHAM,
AUSGUSTER GEISLER.